(12) United States Patent
Cornic et al.

(10) Patent No.: US 8,384,587 B2
(45) Date of Patent: Feb. 26, 2013

(54) RADAR FOR AERIAL TARGET DETECTION FITTED TO AN AIRCRAFT NOTABLY FOR THE AVOIDANCE OF OBSTACLES IN FLIGHT

(75) Inventors: Pascal Cornic, Brest (FR); Patrick Garrec, Merignac (FR); Stéphane Kemkemian, Paris (FR)

(73) Assignee: Thales (FR)

( * ) Notice: Subject to any disclaimer, the term of this patent is extended or adjusted under 35 U.S.C. 154(b) by 266 days.

(21) Appl. No.: 12/846,522

(22) Filed: Jul. 29, 2010

(65) Prior Publication Data

US 2011/0193738 A1 Aug. 11, 2011

(30) Foreign Application Priority Data

Jul. 31, 2009 (FR) ...................................... 09 03799

(51) Int. Cl.
*G01S 13/58* (2006.01)
(52) U.S. Cl. .................. 342/107; 342/116; 342/130
(58) Field of Classification Search ........... 342/104–146
See application file for complete search history.

(56) References Cited

U.S. PATENT DOCUMENTS

| 3,787,853 | A |   | 1/1974  | Brookner |            |
|-----------|---|---|---------|----------|------------|
| 4,829,305 | A | * | 5/1989  | LaBudde  | ... 342/127 |
| 5,376,939 | A | * | 12/1994 | Urkowitz | ... 342/134 |
| 2008/0299965 | A1 | * | 12/2008 | Lagerman  | ... 455/431 |
| 2009/0285331 | A1 | * | 11/2009 | Sugar et al. | ... 375/297 |

FOREIGN PATENT DOCUMENTS

| FR | 2 741 453 A1   | 5/1997  |
|----|----------------|---------|
| FR | 2 941 304 A1   | 7/2010  |
| WO | 2008/134815 A1 | 11/2008 |

OTHER PUBLICATIONS

L.C. Bomar, et al., "CW Multi-Tone Radar Ranging Using DFT Techniques", 13th IEEE European Microwave Conference, Oct. 1, 2006, pp. 127-132, XP031061260.
Francois Le Chevalier, "Space-Time Transmission and Coding for Airborne Radars", Radar Science and Technology, Dec. 1, 2008, pp. 411-421, vol. 6, No. 6, XP009130974.
Robert Malmqvist, et al., "On the Use of MEMS Phase Shifters in a Low-cost Ka-band Multifunctional ESA on a Small UAV", 2007 Asia-Pacific Microwave Conference, Dec. 11, 2007, pp. 1-4, IEEE, Piscataway, NJ, USA, XP031279994.

* cited by examiner

*Primary Examiner* — Timothy A Brainard
(74) *Attorney, Agent, or Firm* — Baker & Hostetler, LLP

(57) ABSTRACT

A radar being carried by an aircraft includes means for transmitting an RF wave towards a target, said wave having a double form, a first waveform being composed of at least two sinusoids of different frequencies transmitted simultaneously, the radar comprising reception circuits receiving the signals reflected by the target and analysis means performing the detection of the target on the basis of the signals received. The second waveform is of the pulse type. The transmitted waveform is dependent on the relative speed of the target with respect to the carrier and on the absolute speed of the carrier.

12 Claims, 4 Drawing Sheets

RADAR FOR AERIAL TARGET DETECTION FITTED TO AN AIRCRAFT NOTABLY FOR THE AVOIDANCE OF OBSTACLES IN FLIGHT

CROSS-REFERENCE TO RELATED APPLICATIONS

This application claims priority to foreign France patent application No. 0903799, filed on Jul. 31, 2009, the disclosure of which is hereby incorporated by reference in its entirety.

FIELD OF THE INVENTION

The present invention relates to a radar for aerial target detection fitted to an aircraft, for example a drone. It applies notably in respect of the detection and the avoidance of obstacles in flight.

BACKGROUND

The achieving of a non-cooperative radar function for detecting aerial obstacles for aircraft, in particular for drones, is essential in order to allow the insertion of autopiloted aircraft into the non-segregated aerial domain. It is part of the obstacle detection and avoidance function known by the name "Sense and Avoid".

Such a radar must have a very wide observation field, typically ±120° in azimuth and ±15° in elevation, and must be capable of scanning space in a very short time, having regard to the time required to engage an avoidance manoeuvre in the event of a risk of collision. These characteristics correspond approximately to a "human" pilot's environment observation capacity.

Under these conditions, it is beneficial to use an antenna or several antennas with a wide transmission field, and to simultaneously form, on reception, multiple beams in the illuminated domain.

However, one problem is then the detection of mobile objects in flight against a background of significant ground clutter, in particular when the antenna beam is relatively wide and the level of the sidelobes is significant. This problem becomes all the more complicated to deal with the lower the altitude of the aircraft.

There is therefore a need to define a radar capable of detecting aircraft in flight that risk colliding with the carrier, whatever their approach speeds. Moreover, the volume, weight and cost of such a radar ought also to be minimized.

Radar devices meeting this requirement do not currently exist. However, comparable functions exist, notably for warplanes, which have an air-to-air detection mode. These radars cover a more extensive distance domain than that required in the present application defined above, but they cover a markedly smaller angular domain with a longer renewal period.

These modes use a directional antenna, which scans the monitoring domain mechanically or electronically, which is incompatible with the present application, having regard to the amplitude of the domain to be monitored and the maximum refresh time, which is of the order of a second.

Detection is conventionally performed by detecting the Doppler effect, thereby making it possible to some extent to separate the targets from the ground clutter.

These modes are known by the names HRF, MRF and LRF, corresponding respectively to the modes of transmission with high, medium and low recurrence frequency. They are amply described in the literature.

In the HRF mode, the detection of approaching slow targets is limited by the quality of the sidelobes of the antenna and exacerbated by the large amount of distance aliasing in the target search domain. Processing operations for minimizing these impediments exist, but they are very complicated.

In the MRF mode, the detection of both slow and fast targets may be affected by the clutter seen by the antenna sidelobes. The processing is complex on account of the need to simultaneously manage the distance ambiguities and the speed ambiguities. As previously, processing methods exist but remain very unwieldy in terms of implementation.

In the LRF mode, the "look down" detection performance is low on account of the large amount of speed aliasing, in particular:

The ground clutter of the main lobe occupies the major part of the ambiguous speed domain;

There is also a risk of false alarms on ground vehicles on account of the speed ambiguities, which mix up slow and fast vehicles;

The Doppler ambiguities are complex to remove;

Finally, this type of mode requires a high peak power.

In any event, the solutions implemented on warplanes cannot be applied directly to an autopiloted aeroplane, having regard to the amplitude of the angular domain to be explored and also for obvious cost reasons.

Moreover, the speed domain and range domain for the obstacle detection and avoidance application are different from those of the air-to-air modes for warplanes.

SUMMARY OF THE INVENTION

The invention notably allows, in an economic manner, the production of a radar capable of detecting aircraft in flight that risk colliding with the carrier of the said radar, whatever the approach speeds involved. For this purpose, the subject of the invention is a radar device for aerial target detection carried by an aircraft, the device comprising means for transmitting an RF wave towards a target, the said wave having a double form, a first waveform being composed of at least two sinusoids of different frequencies transmitted simultaneously, the radar comprising reception circuits receiving the signals reflected by the target and analysis means performing the detection of the target on the basis of the signals received.

The second waveform is for example of the pulse type.

The transmitted waveform is for example dependent on the relative speed of the target with respect to the carrier and on the absolute speed of the carrier.

In a possible embodiment, the first waveform is transmitted when the relative speed of the target is higher than the absolute speed of the carrier. Likewise, the second waveform may be transmitted when the relative speed of the target is lower than the absolute speed of the carrier.

In one possible embodiment, the first waveform uses a number N of sinusoids of different frequencies, the transmitted wave being composed of a pair of two sinusoids transmitted simultaneously, the pairs of sinusoids being modified sequentially, the said device comprising processing means performing a distance ambiguity removal on the basis of the differential phases associated with the pairs of sinusoids.

In another possible embodiment, the first waveform is composed of N sinusoids of different frequencies transmitted simultaneously, the said device comprising processing means computing the differential phases associated with each pair of sinusoids constituted from among the N transmitted sinusoids and performing a distance ambiguity removal on the basis of these differential phases.

The pulses of the second waveform are for example frequency coded.

A recurrence can comprise a series of pulses each coded according to a distinct frequency. The duration of recurrence is for example adapted continually as a function of the speed of the carrier.

The duration of recurrence may be adapted continually as a function of the reaction time of the carrier so as to avoid a collision with the target.

The transmission being carried out on one or more fixed beams, reception is performed for example under computational beam-forming.

The transmission of N simultaneous sinusoids is for example performed by N amplifiers each assigned to a sinusoid, each amplifier being for example linked to a distinct transmission antenna.

BRIEF DESCRIPTION OF THE DRAWINGS

Other characteristics and advantages of the invention will become apparent with the aid of the following description, offered in relation to appended drawings, which represent.

DETAILED DESCRIPTION

Figure 1:
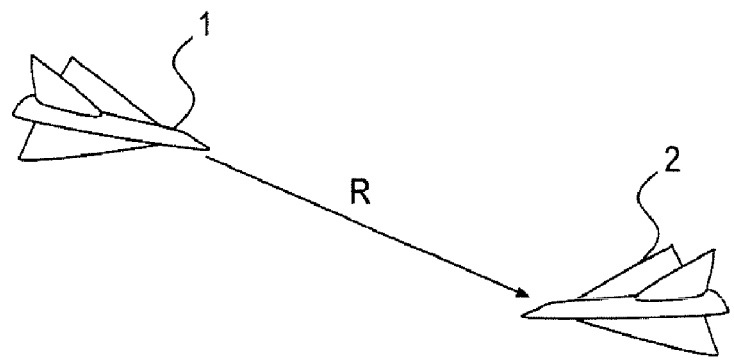
FIG. 1, an illustration of an aircraft, for example a drone, carrying a radar according to the invention in the presence of another target aircraft.

FIG. 1 illustrates an aircraft 1, for example a drone, carrying a radar according to the invention in the presence of another aircraft 2, situated at a distance R, in a situation where a potential risk of collision between the two aircraft exists.

A radar according to the invention performs the following operations:
Differentiation and dimensioning of the radar distance and speed detection domain as a function of the speeds of the carrier 1 and of the intended targets 2, of the altitude of the carrier and of the minimum notice time for avoiding the collision
Segmentation of the distance/speed domain so as to process separately the zones where the targets appear in contrast against the ground clutter, from the zones where the targets appear in contrast against the internal noise of the radar receiver.
Dynamic adaptation of the waveform of the radar as a function both of the speed and of the altitude of the carrier, so as to optimize the probability of detection as a function of context.

Under these conditions, the utilization of the radar resources is optimized continually and the target detection capabilities are enhanced, notably at low altitude.

Two speed domains notably can be considered. A first domain is the so-called "exo-clutter" domain, that is to say the domain in terms of target speed, in which a Doppler analysis of conventional "MTI" type, known to the person skilled in the art, systematically places the target outside of the Doppler zone of the ground clutter when a waveform with no speed ambiguity is used. This domain corresponds to rather fast targets that could collide with the carrier 1. More precisely, the speeds satisfy the following sufficient condition:

$$\text{VRR}_{TARGET} > V_{CARRIER} \quad (1)$$

$V_{CARRIER}$ being the modulus of the speed of the carrier with respect to a fixed reference marker on the ground, that is to say the absolute speed of the carrier, and $\text{VRR}_{TARGET}$ being the relative radial speed of the target with respect to the carrier. It is positive in the case of an approach and only the case where this speed is positive has to be considered in the case of obstacle avoidance.

Typically, the maximum speed of the carrier 1 is for example $V_{CARRIER}=100$ m/s, and the maximum speed of the target 2, with respect to the ground, is for example Vr=300 m/s, thus giving a maximum approach speed VRRmax=400 m/s.

For these targets, the radar of the carrier 1 must detect sufficiently far to avoid a collision. Typically, the minimum notice time Tp in the most unfavourable case, corresponding to a not very agile aircraft, is Tp=22 seconds, which leads to a minimum range of the order of 6 NM.

This therefore entails favouring the range budget by using the maximum power available. Stated otherwise, it is important to guarantee a thermal signal-to-noise ratio greater than a certain minimum value throughout the distance domain of interest.

The RF power available for transmission, for a given antennal definition, is dimensioned with respect to this speed domain, matching the minimum range requirement, 6 NM for example.

The separation of the targets, which are not separated by angular criteria relating to the selectivity of the antennal system, can be performed by means of the Doppler effect, on condition that the coherent integration time is sufficient. For example, an integration time of 50 ms leads to a Doppler resolution of 20 Hz and to a separating power of 0.32 m/s in the X band, this being sufficient when limiting oneself to realistic multi-target scenarios.

However, the distance resolution is not a dimensioning criterion. Likewise, a mediocre distance measurement accuracy may be suitable (class 100 m) in so far as a relative inaccuracy in terms of distance has no impact on the decision as to whether to change trajectory with a view to avoiding the collision.

A second domain to be considered is the endo-clutter domain, that is to say the domain for which the relative speed of the targets 2 is lower than the speed of the carrier 1 and for which no waveform of the LRF, MRF or HRF modes defined previously can enable the target to be placed against just the thermal noise background of the radar. The following relation is then satisfied:

$$\text{VRR}_{TARGET} < V_{CARRIER} \quad (2)$$

with the same notation as for relation (1).

For these targets, by considering the typical values above, the maximum approach speed is VRR=100 m/sec and the consequent minimum range requirement is 2200 m.

In this domain, the range budget is no longer the dimensioning element, and it is important to decrease the clutter power intercepted by the radar by minimizing the distance and speed resolution cell, the characteristics of the antenna having been defined elsewhere.

Moreover, below a certain distance, corresponding to the minimum reaction time to avoid the obstacle, detection becomes pointless, thus further limiting the distance domain instrumented in this mode. For example, by estimating this time at 5 seconds, a blind zone of 500 m may be accepted.

According to the invention, for each of the two speed domains characterized above by relations (1) and (2), a waveform and a corresponding processing, which are described below, are defined.

Figure 2:
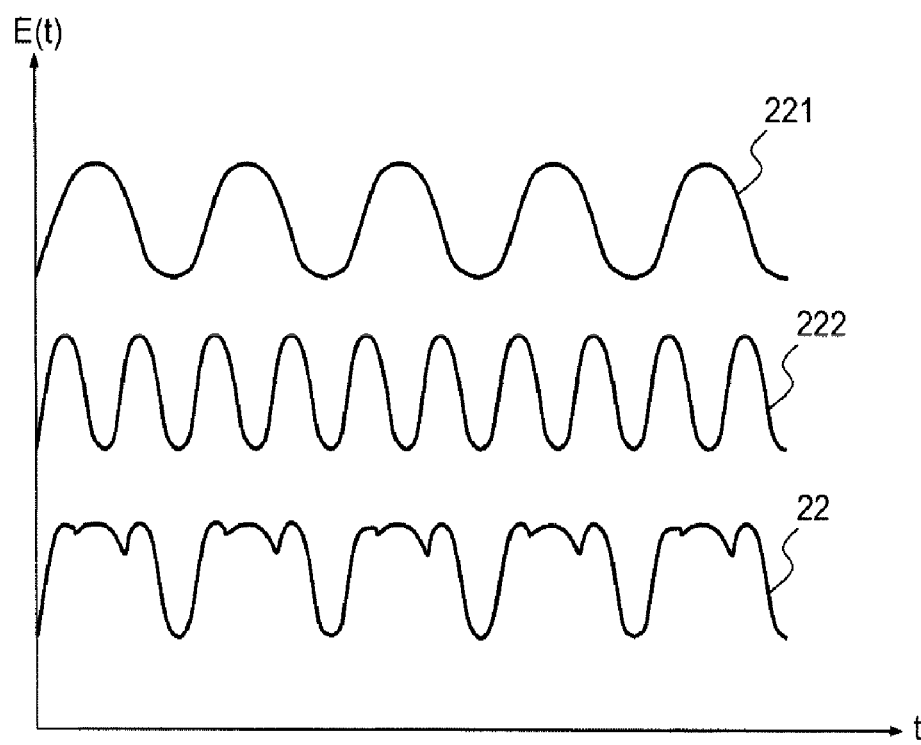
FIG. 2, an example of a first waveform of a radar according to the invention, adapted to a first domain of relative speeds between the carrier and a target.

FIG. 2 presents an exemplary waveform adapted to the targets 2 whose relative speed is higher than the speed of the carrier 1 of the radar. The speed of the target is for example determined conventionally by means of a Doppler frequency analysis, the speed of the carrier being captured elsewhere and transmitted to the radar processing means.

For this first domain, a waveform that is non-ambiguous in Doppler frequency is chosen so as to eliminate the spectral aliasings in order to guarantee visibility of the targets in contrast against thermal noise with the highest possible shape factor.

The waveform is sinusoidal with N frequencies, FIG. 2 illustrating the case where N=2. FIG. 2 therefore presents an example where frequencies F1 and F2 are transmitted simultaneously. The waveform E(t) is then represented by a curve 22, which is the sum of a sinusoid of frequency F1 and of a sinusoid of frequency F2. In FIG. 2, for the sake of legibility the sinusoids are shifted with respect to the zero value represented by the time axis t. In reality, they would have zero mean. This case with two frequencies may be generalized to N frequencies.

As regards the resulting wave 22, a continuous waveform with low instantaneous band is chosen. The coherent integration time is determined so as to satisfy two contradictory criteria:
- It must be as great as possible so as to obtain better sensitivity and better speed separating power (minimum Doppler filter width);
- It must not exceed the stationarity time of the observed targets as compared with the possible phase and amplitude fluctuations of the signal received, which are related notably to the relative motions. Stated otherwise, the motion of the target never being either perfectly constant or reduced to the motion of a single bright point, the resulting spectral spreading must remain below the passband of a Doppler filter. It is possible to exceed this duration, but significant losses appear.

Typically, this time is of the order of 50 ms for an X-band radar, this corresponding to a Doppler discrimination of the order of 0.3 m/s in the X band.

In order to estimate the distance to the detected targets, the radar waveform is modulated in phase or in frequency, amplitude modulation being notably excluded since the requirement is to profit from the maximum power available continually.

Conventional solutions based on phase or frequency code modulation, of the FSK or "chirp" type, over the coherent integration time are not suitable. Indeed, they introduce distance ambiguities which are complex to eliminate, having regard to the distance/speed domain to be processed, and are of the order of 6 NM×400 m/s as a general rule.

As indicated previously, according to the invention, during the coherent integration time the radar simultaneously transmits two sinusoidal signals spaced apart in frequency, one at a first frequency F1 and the other at a second frequency F2, the spacing between these frequencies $$\Delta F = |F1 - F2|$$

complying with the following conditions:
- Being low enough for it to be possible to consider the Doppler frequency of the echoes received to be equal for these two frequencies;
- Being wide enough for it to be possible to unambiguously separate the signals received from the targets originating from the two spectral components at F1 and at F2 into two processing channels, having regard to the Doppler shift of the targets or of the ground clutter, which is not known a priori. However, a maximum interval is fixed for this Doppler effect. This interval is determined a priori by considering the spans of "plausible" speeds of the targets and of the carrier of the radar.
- Being wide enough for a distance measurement to be possible on the basis of a differential phase measurement at reception, and being so with acceptable accuracy.
- Being low enough for it to be possible to correctly manage the ambiguities inherent in all phase measurements (see the waveform used below).

It should be noted that the invention is described in respect of an application with two simultaneous frequencies, but that it may be extended to an application with N discrete frequencies transmitted simultaneously.

Figure 3:
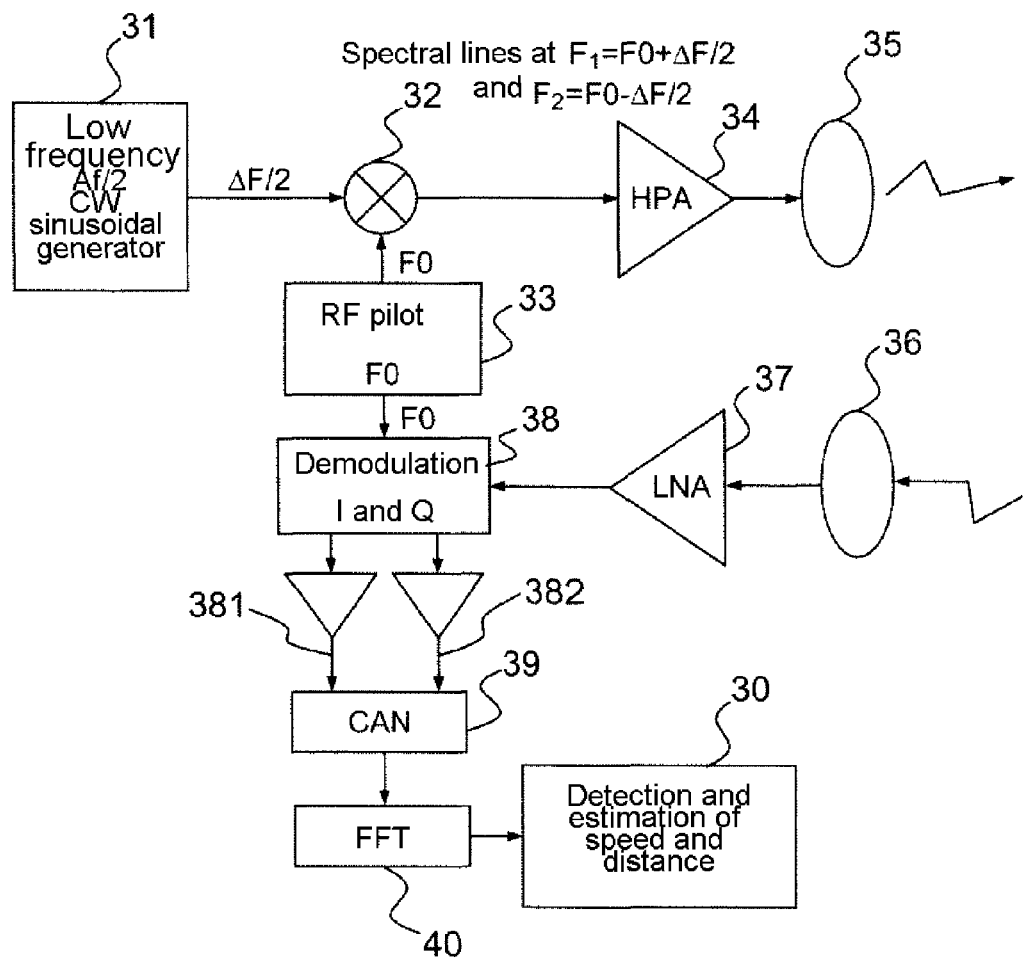
FIG. 3, a schematic diagram of an example of a radar according to the invention.

FIG. 3 presents, by means of a schematic diagram, an exemplary embodiment of a radar according to the invention. It comprises for example a low-frequency $\Delta F/2$ continuous sinusoidal wave generator 31. The signal provided by this generator 31, at frequency $\Delta F/2$, is transposed to the frequency F1 and to the frequency F2, where:

$$F1 = F0 + \Delta F/2;$$

$$F2 = F0 - \Delta F/2.$$

For this purpose, a mixer 32 receives on one input the signal at $\Delta F/2$ originating from the generator 31 and receives on another input a signal at the frequency F0 originating from an RF pilot 33. The mixer 32 outputs sinusoidal signals at the frequencies F1 and F2. The low-power signals provided by the mixer 33 are amplified by a power amplification chain 34, the amplified signals being provided to a transmission antenna 35 which transmits a signal at two frequencies F1 and F2.

On reception, the signals are captured by a reception antenna 36 which may be the same as the reception antenna on condition that isolation circuits, not represented, are provided between the transmit and receive channels. The signals received are amplified, at the antenna output 36, by a low noise amplifier 37. The output of the amplifier is linked to a demodulation circuit 38.

The radar receiver separately processes the two noisy sinusoids received in two channels, filtered around F1 and around F2 respectively. This filtering may be analogue or digital. A coherent demodulation 38 is then performed in each of the two respective channels so as to form, in analogue or digital fashion, two channels I and Q, 381, 382. It should be noted that, in return for certain additional constraints on the choice of the parameters of the waveform, a demodulation providing only the real signal "I" is possible.

The two signals originating from the two channels I, Q are for example digitized by means of an analogue-digital converter 39. A spectral analysis is then performed, for example by Fourier transform 40, on each of the channels relating respectively to F1 or to F2.

In the event that a target is present, the spectral analyses on the channels F1 or F2 provide a spectral line at the frequency $F_D - \Delta F/2$ on the channel F1 and, respectively, at the frequency $F_D + \Delta F/2$ on the channel F2. These two spectral lines have similar amplitudes, to within the noise and tolerances on the circuits.

If these two spectral lines satisfy certain detection conditions, a target is declared "detected" by detection means 30.

This target is characterized, notably, by the Doppler frequency $F_D$ and the differential phase between these two spectral lines:

$$\Delta\Phi = \frac{4\pi \cdot \Delta F}{c} R + \Phi_0 \bmod 2\pi \quad (3)$$

where:
- $F_D$ represents the Doppler frequency of the target considered;
- R the distance of the target 2 considered with respect to the carrier 1;
- C the speed of light;
- $\Delta F$ the gap between the frequencies F1 and F2.

$\Phi_0$ is a "phase at the origin" term. According to the RF chain production method, this term is zero or else it needs to be calibrated periodically. In the latter case, the methods are assumed to be known and they consist for example in reinjecting, during calibration sequences, the signal transmitted directly into the receiver, with a zero distance. In the subsequent description it is therefore assumed that $\Phi_0$=0.

From the measurement of the differential phase according to the above relation (3), an estimation of the distance to the target is deduced:

$$R = \Delta\Phi \frac{c}{4\pi \cdot \Delta F} \quad (4)$$

The phase measurement being to within modulo $\pi$, the distance measurement is therefore also ambiguous to within $$\frac{c}{2 \cdot \Delta F}.$$

It was seen previously that the frequency gap $\Delta F$ must be greater than the Doppler frequency band of the targets in order to be able to definitely separate the pathways relating to F1 and to F2. The above-mentioned typical values of relative speed VRR of the target alone justify a gap $\Delta F$, so that the distance measurement in the domain considered, of the order of 6 NM, is necessarily rendered ambiguous.

Moreover, the higher $\Delta F$, the more locally accurate the distance measurement, for given phase noise, but the greater the risk of the measurement being ambiguous.

It is therefore necessary to remove these ambiguities. For this purpose, use is made of N pairs of frequencies spaced apart by $\Delta F_i$ with $i\in[1,N]$, where N is greater than 1. These pairs of frequencies may be transmitted:
- Either sequentially;
- Or simultaneously.

Each of the two solutions does indeed present certain advantages but also certain drawbacks. It is also possible to contemplate solutions which hybridize these two modes of operation.

Figure 4A:
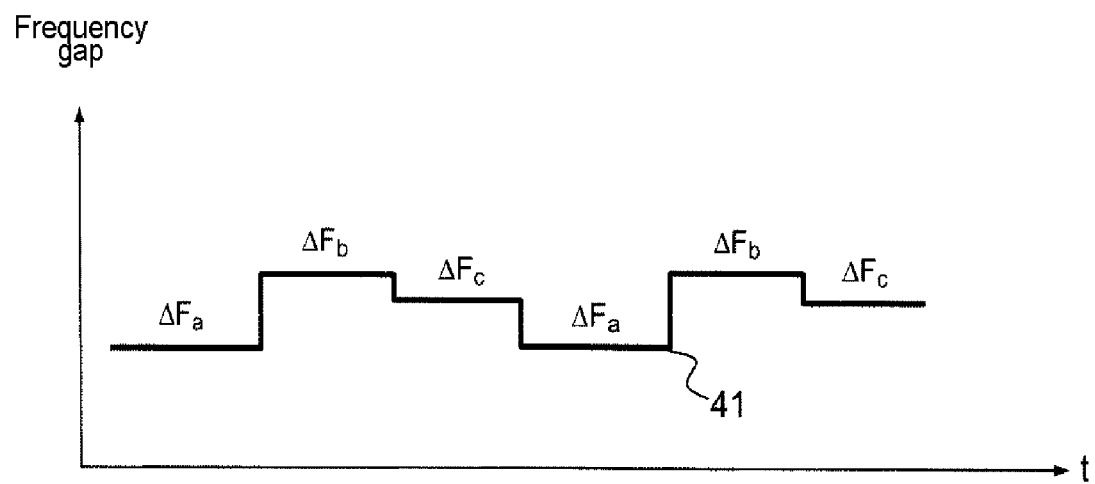
FIGS. 4a and 4b, other examples of the aforementioned first waveform.
Figure 4B:
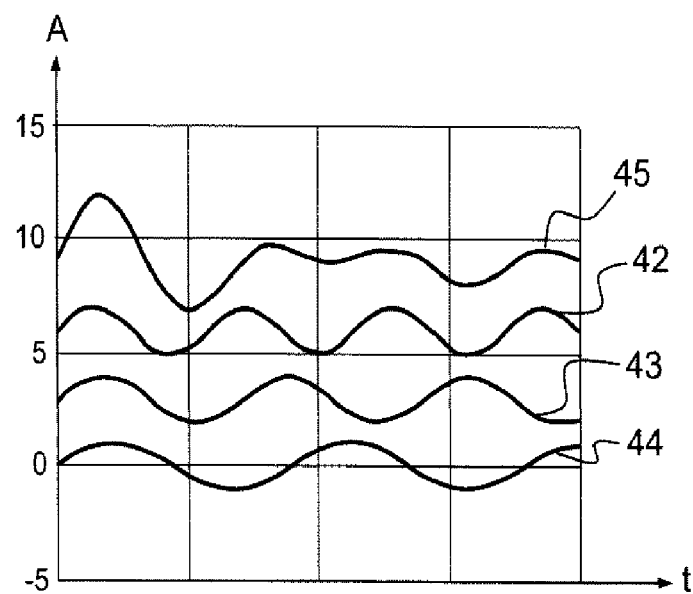

FIGS. 4a and 4b illustrate respectively the transmission of sequential pairs of frequencies and the transmission of simultaneous pairs of frequencies, these pairs being used to remove the distance ambiguity. To illustrate the transmission of these pairs, a case of application to three frequencies, that is to say the case where N=3, is considered.

In the case of FIG. 4a, the radar always transmits two frequencies simultaneously, but the pair of frequencies is modified sequentially. Thus, the radar simultaneously transmits frequencies F1 and F2, and then simultaneously transmits the frequency F1 and a frequency F3 and finally simultaneously transmits the frequencies F2 and F3 before resuming the simultaneous transmission of F1 and F2, and so on and so forth.

More particularly, FIG. 4a illustrates by means of a curve 41 the frequency gap as a function of time, this gap successively taking the values $\Delta Fa$, $\Delta Fb$ and $\Delta Fc$, which correspond to the three successively transmitted pairs of frequencies, doing so cyclically, where:

$\Delta Fa = F1-F2;$ $\Delta Fb = F1-F3;$ $\Delta Fc = F2-F2.$

FIG. 4b represents by means of three curves the three simultaneously transmitted sinusoids and also the resulting wave by means of a curve 45. For legibility reasons, the sinusoids are represented shifted although they would have zero mean in reality. In this case the signal received, corresponding to the transmission of the total signal 45, is firstly separated into three channels. For this purpose, the intervals between each of the three sequences are greater than the maximum Doppler frequency $F_D$ to be taken into account.

Once the channels have been separated, the differential phases are computed by constructing pairs:

$\Delta Fa = F1-F2;$ $\Delta Fb = F1-F3;$ $\Delta Fc = F2-F2.$

The differential phases associated with these pairs are thereafter used in a manner similar to the sequential case relating to FIG. 4a.

One benefit of the simultaneous mode as compared with the sequential mode is that it makes it possible to remove the ambiguity over a shorter period of time. It is not necessary to wait for the transmission of all the frequencies. This shorter period of time makes it possible for example to carry out the frequency diversity on the mean value of the n-tuple (F1, F2, F3, . . . FN) in a general case with N frequencies. This has notably the advantage of reducing the effect of the fluctuation in the radar cross section RCS of the target 2 and of obtaining more stable detection.

An ambiguity removal method is described notably in French patent application No. 09 00241 filed on 29 Jan. 2009.

Figure 5:
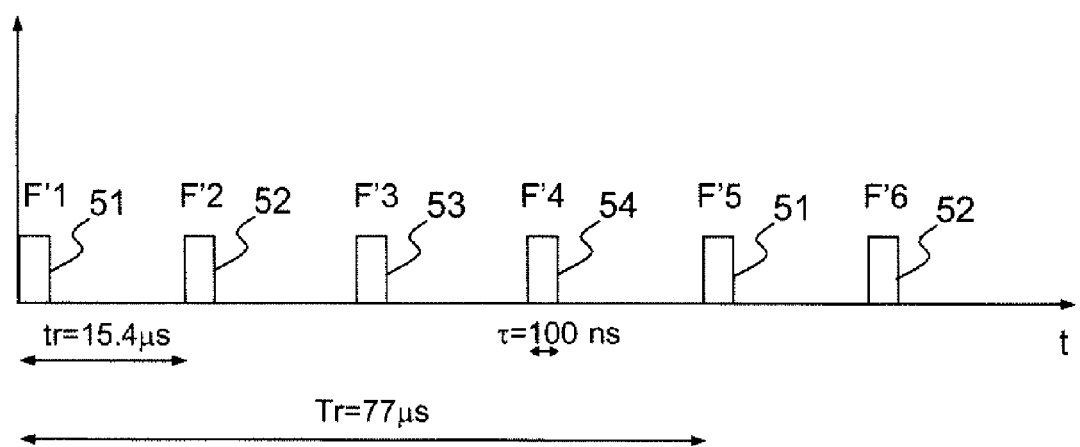
FIG. 5, an example of a second waveform adapted to a second domain of relative speeds.

FIG. 5 presents a pulse waveform adapted to the targets 2 whose relative speed is less than the speed of the carrier 1. For this second operating domain, the sought-after range Rmax and the distance to be instrumented are also given by the following relation:

Rmax=Vp.T (5)

where T is the reaction time necessary to avoid a collision.
Again taking, by way of example, the typical values:
T is equal to 22 seconds for the most unfavourable case, the distance to be instrumented is then Rmax=Vpmax.T=2200 m, this corresponding to a round trip propagation time of $\tau$=2Rmax/C=14.6 µs.
T is equal to 5 seconds for the most favourable case, the blind zone possibly extending up to Rmin=Vpmax.T=500 m for a carrier at 100 m/s, this corresponding to a round trip propagation time of $\tau$=2Rmax/C=3.33 µs.

The sought-after range being lower than in the first mode of operation described above, and the peak power of the radar having been dimensioned for the first mode, the shape factor may be degraded in the ratio of the intended ranges to the power 4, i.e. for example $(2200/12964)^4 = 8.4 \; 10^{-4}$, again taking the previously stated typical values.

The power to be transmitted in this second mode is therefore not a dimensioning element, and a pulsed waveform with moderate shape factor may advantageously be used.

In order to minimize the ground clutter power in the radar confusion cell, a waveform that is Doppler-unambiguous in the clutter band is chosen. Advantageously, the duration of recurrence is for example adapted continually as a function of the speed of the carrier. It is also for example adapted to the reaction time of the carrier so as to avoid a collision.

For a carrier speed Vp, the recurrence frequency Fr of the radar is then greater than the minimum recurrence value $Frmin=4Vp/\lambda$, the ground clutter being distributed between the frequencies $-2Vp/\lambda$ and $+2Vp/\lambda$.

Again taking the typical values, for example Vpmax=100 m/sec, it follows that Frmin>12500 Hz. The maximum duration of recurrence Trmax is then equal to 80 μs.

For example Tr=77 μs is chosen, this corresponding to an ambiguous distance cTr/2=11550 m, c being the speed of light.

The distance domain to be instrumented being small compared with the ambiguity distance, it is then possible to populate the recurrence of duration Tr with several pulses 51, 52, 53, 54.

These pulses are spaced apart by a time tr similar to the propagation time corresponding to the limit of the instrumented domain with the objective of optimizing the radar range budget.

The pulses 51, 52, 53, 54 are frequency coded so as to maintain the furthest possible ambiguity distance. In the example of FIG. 5, four frequencies are used. Inside a recurrence period Tr covering these four frequencies, the first pulse is coded at a frequency F'1, the second pulse is coded at a frequency F'2, the third pulse is coded at a frequency F'3 and the fourth pulse is coded at a frequency F'4. The number of frequencies used may be equal to 1 or to another integer greater than 1, this value depending notably on the compromise sought between the mean power and the usable domain.

On this basis, by adapting the reception processing to the recurrence period tr where the transmission frequency is Fi, only the pulses received at the frequency Fi are detected. By way of example, it is possible to choose tr=15.4 μs in a scheme with 4 frequencies. The distance ambiguity is rejected at a distance corresponding to a propagation time of 4 tr and the ambiguous echoes are attenuated in a ratio $4^4$, i.e. 24 dB with respect to the non-ambiguous echoes at the limit of the instrumented domain, this being sufficient.

The pulse width is chosen to be as large as possible, its maximum value being bounded by the acceptable blind distance, i.e. 3.33 μs for a carrier at 100 m/s for example. In order to reduce the clutter power intercepted by the radar, pulse compression, for example "chirp", may be used.

A modulation band of the order of 10 MHz, giving a resolution of 15 m, may be used.

Globally, this optimization of the waveform makes it possible to increase the sensitivity of the radar and thus to detect slow targets of very low radar cross section, RCS, at low altitude:

The shape factor is optimized to maximize the mean power transmitted and therefore the sensitivity;
The radar resolution cell is minimized, thereby reducing the power of the ground clutter and increasing the detection capability for very low speed targets;
The distance and speed ambiguities are easily rejected.

This second waveform illustrated by FIG. 5 and the associated processing may be implemented in accordance with the schematic of the figures of FIG. 3 by adding thereto a transmission pulse modulation device, and optionally a pulse compression device. Other waveforms may be used, apart from a pulse wave, for the second domain target speeds lower than corresponding to the relative speeds of targets below the speed of the carrier.

Advantageously, the waveform is adapted continually as a function of the speed and altitude of the carrier, and of the position and relative speed of the target. This adaptation is also dependent on the reaction time of the carrier in avoiding a collision.

As regards the schematic diagram of FIG. 3, the latter may be supplemented with a stage of computational beam-forming in the reception circuits in the case of a radar with computational beam-forming on reception. In this case, transmission may advantageously be carried out on one or more wide-aperture fixed beams.

The transmission part of this schematic diagram uses an analogue mixer 32 balanced to generate two symmetric frequencies around a mean value F0, these two frequencies being contained in the same signal, which is thereafter amplified to a required power. This simple system may nonetheless have certain drawbacks:

it uses an analogue hardware component, a balanced mixer, where residuals of the central frequency F0 may be found at output;
it does not make it possible to produce the simultaneous waveform with three or more frequencies;
it obliges the power amplifier 34 to work on a signal of non-constant amplitude, which is detrimental to its efficiency and may induce various troublesome spurious effects.

An alternative solution is for example to separately transmit N sinusoidal signals of distinct frequencies, N being greater than or equal to 2. This multiple generation may be carried out by digital synthesis systems. Likewise, it may be beneficial to amplify the power of these N sinusoidal signals separately. The power amplifiers can then operate in a non-linear or saturated regime. Finally, to eliminate the losses of a power summation system, the radar can transmit these N amplified sinusoidal signals by N antennas, each being assigned to an amplifier.

What is claimed is:

1. A radar device for aerial target detection carried by an aircraft, comprising:
   means for transmitting an RF wave towards a target, said wave having a double form, a first waveform being composed of at least two sinusoids of different frequencies transmitted simultaneously,
   the radar further comprising reception circuits receiving signals reflected by the target and analysis means performing a detection of the target on a basis of the signals received,
   wherein a second waveform is a pulse type waveform; and
   wherein the transmitted wave is dependent on a relative speed of the target with respect to the aircraft and on an absolute speed of the aircraft.

2. A radar device according to claim a 1, wherein the first waveform is transmitted when the relative speed of the target is higher than the absolute speed of the aircraft.

3. A radar device according to claim a 1, wherein the second waveform is transmitted when the relative speed of the target is lower than the absolute speed of the aircraft.

4. A radar device according to claim 1, wherein the first waveform uses a number N of sinusoids of different frequencies, the transmitted wave being composed of a pair of two sinusoids transmitted simultaneously, the pairs of sinusoids being modified sequentially, the device further comprising processing means performing a distance ambiguity removal on a basis of differential phases associated with the pairs of sinusoids.

5. A radar device according to claim 1, wherein the first waveform is composed of N sinusoids of different frequencies transmitted simultaneously, the device further comprising processing means computing differential phases associated with each pair of sinusoids constituted from among N transmitted sinusoids and performing a distance ambiguity removal on a basis of these differential phases.

6. A radar device according to claim 5, wherein the pulses of the second waveform are frequency coded.

7. A radar device according to claim 6, wherein a recurrence comprises a series of pulses each coded according to a distinct frequency.

8. A radar device according to claim 7, wherein a duration of recurrence (Tr) is adapted continually as a function of a speed of the aircraft.

9. A radar device according to claim 7, wherein a duration of recurrence (Tr) is adapted continually as a function of a reaction time of the aircraft so as to avoid a collision with the target.

10. A radar device according to claim 1, wherein, the transmission being carried out on one or more fixed beams, reception is performed under computational beam-forming.

11. A radar device according to claim 1, wherein the at least two sinusoids comprise transmission of N simultaneous sinusoids performed by N amplifiers each assigned to a sinusoid.

12. A radar device according to claim 11, wherein each amplifier is linked to a distinct transmission antenna.

* * * * *